Figure 1:
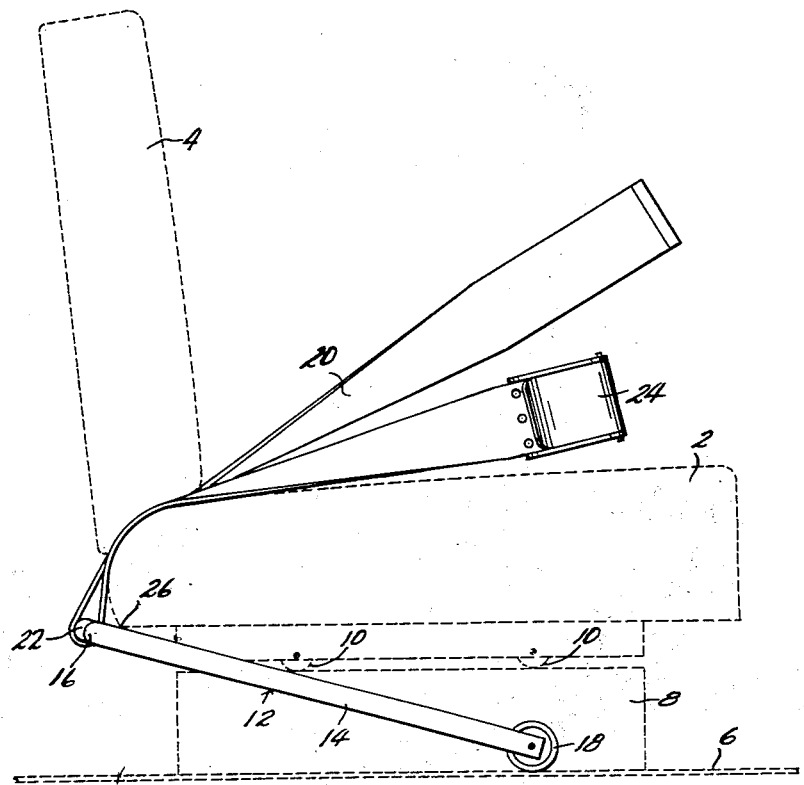

June 27, 1961 C. E. MOELLER 2,990,009
SAFETY BELT APPARATUS FOR AUTOMOBILES
Filed Oct. 26, 1959

INVENTOR.
Calvin E. Moeller
BY John A. Hamilton
Attorney.

United States Patent Office 2,990,009
Patented June 27, 1961

2,990,009
SAFETY BELT APPARATUS FOR AUTOMOBILES
Calvin E. Moeller, Lake Forest, Bonner Springs, Kans.
Filed Oct. 26, 1959, Ser. No. 848,604
2 Claims. (Cl. 155—189)

This invention relates to new and useful improvements in automobile safety apparatus, and has particular reference to safety belts especially adapted for use in automobiles.

A principal object of the present invention is the provision of a novel mounting means or holder for an automobile safety belt whereby said belt need not be permanently affixed to the automobile floor, seat frame or any other portion of the automobile structure, but may be applied quickly and easily to virtually any automobile without the use of tools of any kind.

Another object is the provision of a safety belt apparatus of the character described, which may be shifted transversely along an automobile seat for use at any point in the span of the seat, and which will accommodate itself automatically to forward or rearward movement of the seat.

A further object is the provision of a safety belt apparatus of the character described, which affords the user considerably greater freedom of movement than heretofore possible, without sacrificing the security or safety provided thereby.

Other objects are simplicity and economy of construction, efficiency and dependability of operation, and universality of application.

Figure 2:
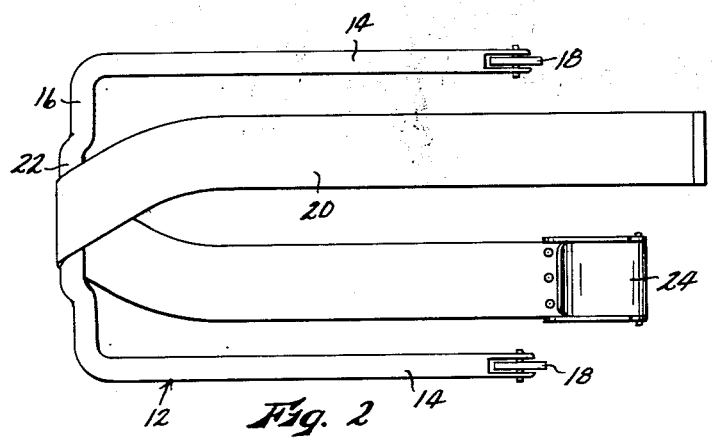

With these objects in view, as well as other objects which will appear in the course of the specification, reference will be had to the drawing, wherein:

FIG. 1 is a side elevational view of an automobile safety belt apparatus embodying the present invention, illustrated as applied to an automobile seat shown in dotted lines, and FIG. 2 is a top plan view of the safety belt apparatus shown in FIG. 1.

Like reference numerals apply to similar parts throughout the drawing, and the numerals 2 and 4 apply respectively to the seat and back cushions of an automobile seat, said cushions being of ordinary construction. Seat cushion 2, in the front seat of an automobile, is supported above the car floor 6 by means illustrated diagrammatically in FIG. 1, said means constituting a standard 8 fixed to the car floor and on which rollers 10 carried by seat 2 are mounted so that the entire seat may be moved adjustably forwardly or rearwardly to suit the comfort and convenience of the driver. Ordinarily there is a standard 8, or equivalent therefor, at each side of the seat, and the space between these standards is unobstructed.

A safety belt holder is designated generally by the numeral 12, and comprises a length of tubular or rod stock formed in a generally U-shaped configuration having generally parallel legs 14 and a connecting or base portion 16. This holder is adapted to be inserted, with the free ends of legs 14 extending forwardly, between floor 6 and the bottom of seat cushion assembly 2. The length of legs 14 is much greater than the vertical distance between the seat and floor, as shown. A wheel or roller 18 is mounted rotatably at the forward end of each leg 14, said wheels being coaxial on an axis at right angles to said legs.

A flexible safety belt 20 of webbing, leather, or any other suitable material, has its mid-portion trained loosely about connecting portion 16 of holder 12. The central part 22 of said connecting portion is offset slightly rearwardly, and the belt engages said offset portion, being thereby prevented from working toward or onto the extreme end portions of member 16. Both reaches of belt 20 are then extended between the seat and back cushions of the automobile, as shown in FIG. 1. A division between said seat and back cushions, through which the belt may be passed, is virtually universal. The free end portions of the belt may then be passed about the body of a person occupying the seat, and secured together by means of a buckle 24 or other suitable fastener, the details of which are immaterial and are not here shown.

It will be readily apparent that when the belt has been installed and applied as described, any force tending to move the protected person forwardly or upwardly out of the seat will of course be resisted by the belt, the belt tension exerting an upward force on the rearward end of holder 12. Thus each leg 14 of the holder is urged upwardly to engage the seat assembly 2 at the point 26 (see FIG. 1), and wheel 18 is levered downwardly against car floor 6. Therefore, since legs 14 are longer than the vertical space between seat 2 and the floor, and since holder 12 is also held by belt 20 against forward or rearward movement relative to the seat, the holder acts as a substantially immovable anchor for belt 20, which is held just as securely as if it were attached to eyes, cleats or the like riveted or bolted to a rigid portion of the car or seat frame.

The device as illustrated is believed to have several clear and important advantages over any previously known apparatus of this general type. Firstly, it is adapted for use in most types of automobiles. It may be installed quickly and easily by anyone without the use of tools of any kind, since it does not require fixed or permanent connection to any part of the automobile. The device is freely adjustable from side to side of the seat. This is particularly useful in providing safety belt protection for a person sitting in the middle of the front seat of an automobile. In this connection, it is to be noted that the U-shaped configuration of holder 12 provides that it will bridge over the drive shaft tunnel, or other obstruction or irregularities of floor 6. When the car seat 2–4 is shifted forwardly or rearwardly by the driver, rollers or wheels 18 permit accommodation of holder 12 to the new seat position by rolling along floor 6. The unrestrained portions of the belt between holder section 22 and the point where said belt enters between the seat and back cushions is so short that very little relative movement between the holder and seat occurs when the seat is moved. Such relative movement as might actually occur is insignificant and not objectionable in any way. The frictional engagement of the belt between the seat and back cushions is ordinarily quite adequate to keep the rearward end of holder 12 from falling to the floor when the belt is not in use.

The particular method of attaching belt 20 to holder 12 also provides advantages providing greater comfort to the user, particularly in that the user has a greater freedom of movement when the belt is affixed about him, than is possible with conventional belt attaching means. This freedom of movement results first from the fact that both reaches of the belt may be considered as attached to holder 12 at a single point. Thus the user may swing from side to side on the seat, pivoting about a vertical axis passing through the point of attachment of the belt to the holder. The movement thus made possible is slight, since it immediately tends to draw the user tightly against back cushion 4, but nevertheless does much to avoid the uncomfortable sense of confinement which many persons experience when secured by a safety belt. Secondly, the belt is freely slidable, in a direction longitudinal to itself, about portion 22 of the holder, rather than being permanently affixed thereto in any way. This freely running connection also permits the user to move to some degree transversely in the seat, and also to twist himself about in the seat. Despite the freedom of movement just discussed, however, the security and safety of the user as provided by the belt is in no way impaired.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. An automobile safety belt apparatus comprising a planar, elongated holder adapted to be inserted longitudinally in the space between the seat frame and the floor of an automobile and being substantially longer than the vertical extent of said space, whereby simultaneously to bear downwardly against the floor at its forward end at an acute angle thereto and upwardly against said seat frame adjacent its rearward end, a roller mounted rotatably on said holder at the forward end thereof, the axis of said roller being horizontal and transverse to the longitudinal extent of said holder, and a pliable belt attached to the rearward portion of said holder and adapted to be extended upwardly therefrom between the rearward edge of said seat frame and the lower edge of the associated back cushion.

2. An automobile safety belt apparatus as recited in claim 1 wherein said holder is substantially U-shaped and said belt is attached to the connecting portion of said U-shape, whereby the leg portions of said holder extend forwardly beneath said seat frame, and including a pair of said rollers mounted respectively at the forward ends of the legs of said holder, said rollers being coaxial on an axis transverse to said holder legs.

References Cited in the file of this patent

UNITED STATES PATENTS 2,856,991   Princiotta _____ Oct. 21, 1958

FOREIGN PATENTS 1,157,747   France _____ Dec. 30, 1957